Patented June 16, 1953

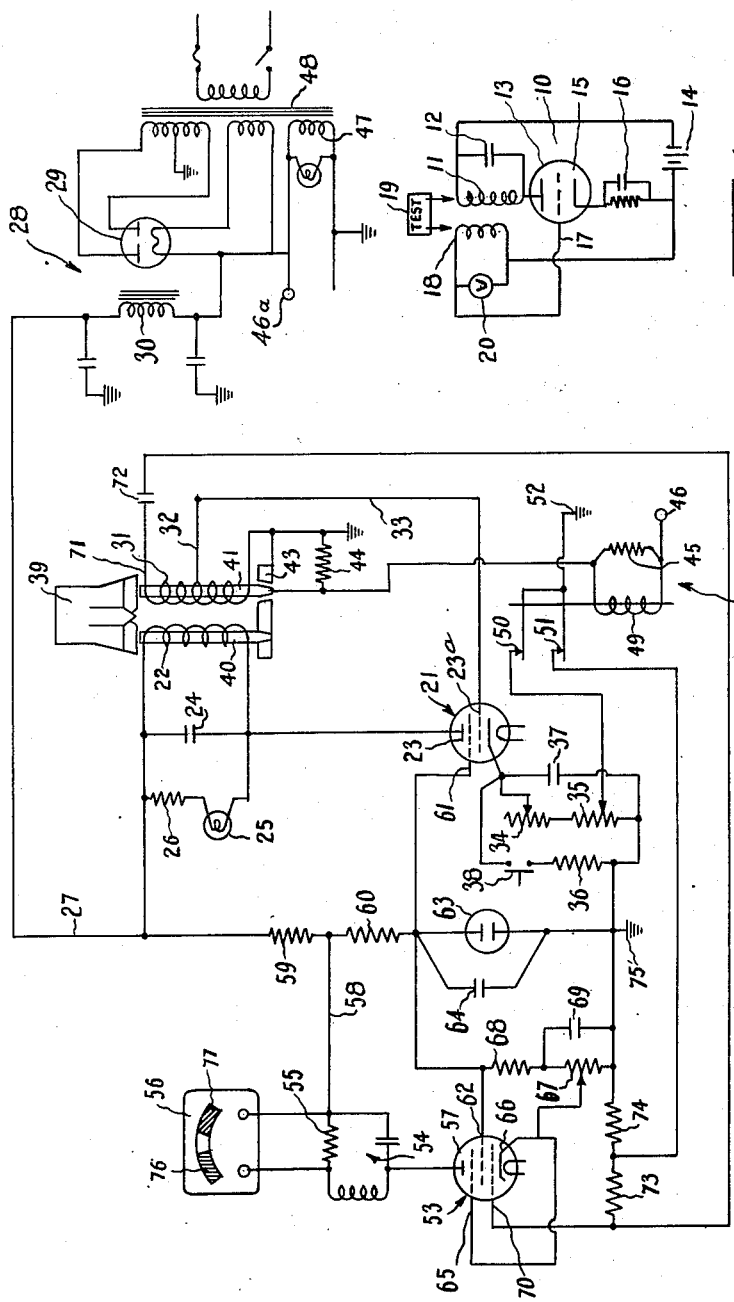

2,642,482

UNITED STATES PATENT OFFICE 2,642,482

ELECTRONIC BIT TESTER

Robert Sidney Segsworth, Toronto, Ontario, Canada

Application January 31, 1950, Serial No. 141,454

5 Claims. (Cl. 175—183)

This invention relates to an electronic bit tester for distinguishing between hard and soft bits by a magnetic class of test of the comparative type.

The objects of the invention will be appreciated by a study of the following specification taken in conjunction with the accompanying drawings.

In the drawings,

Figure 1 is a schematic of the basic circuit diagram of the instrument of the invention illustrating principles embodied in the testing method.

Figure 2 is a schematic of a practical form of instrument according to the invention.

In Figure 1 an oscillator circuit is shown wherein the triode 10 or other suitable electronic amplifier has a resonant circuit comprising the coil 11 and condenser 12 connecting to the anode 13 being in the plate circuit of the said tube and connected to a source of voltage 14 in the conventional manner. The cathode 15 has a resistor and condenser combination 16 in series with the same to the negative side of the voltage supply 14 to provide suitable bias for the grid 17. The feed back coil 18 to grid 17 a variable in its coupling to the primary coil 11 by the test sample 19 which is of a magnetically permeable material.

According to the invention the output of the oscillator is measured from the grid side such as by a suitable voltmeter 20 which for the required sensitivity should be of the electronic type.

The principle involved in the present invention is the control of feed back in the oscillation circuit from the primary coil 11 to the secondary coil 18 in combination with the measuring of the voltage across the grid side of the circuit whereby the output measured is highly sensitive to the magnetic properties of the test piece 19.

In providing an instrument of practical form according to the principles of the invention outlined in Figure 1, care must be taken not only in respect to the particular design of the oscillator circuit but also in respect to the specific arrangement of the output measuring device. The various factors involved will be appreciated by discussion of Figure 2 showing a practical form of instrument.

Referring to Figure 2 a suitable power pentode 21 is employed as the oscillator tube in series with the primary coil 22 by its plate or anode 23. The primary coil 22 has a condenser 24 thereacross for determining the frequency of oscillation and an indicator neon pilot tube 25 in series with resistor 26 is employed in parallel therewith to show when the oscillator is operating. Positive voltage is supplied through the line 27 from a suitable power supply 28 having a known rectifier tube arrangement 29 and filter device 30. The secondary coil 31 has a large number of turns as compared with the primary but includes a tap 32 connecting by a line 33 to the control grid, the tap being located to provide sufficient voltage to operate the grid. The cathode resistors 34, 35 and 36 and by-pass condenser 37 are used to provide appropriate bias. Resistor 36, however, includes a switch device 38 which is manually operable for providing a sudden change in bias in the tube 21 in order to initiate oscillation in a manner hereinafter described in more detail.

A test sample such as the bit 39 illustrated, makes magnetic contact with the pole pieces 40 and 41 by manual placement, the pole pieces being in magnetic circuit relation with the coils 22 and 31. It will be appreciated that the potential generated in the coil 31 will be greatly reduced when the magnetic circuit is opened by removing a bit from the test position and, accordingly, substantial changes must be made in the circuit to sustain oscillation. These changes are accomplished by means of a relay 42 such that when the test piece is removed the pole piece 41 is removed from electrical contact with the pole contact 43 thereby shorting the resistor 44 which is of high value as compared with the resistor 45. The terminal end 46 of resistor 45 electrically connects to the filament supply coil 47 of the low voltage transformer 48 as at 46a. Filament supply voltage or other suitable supply voltage may, therefore, be applied across the relay to ground but the relay 42 is ordinarily in series with a resistor 44 of high value across this supply voltage, and therefore, does not receive sufficient current to be energized when the magnetic circuit is open. However, when the test sample is in place the pole piece 41 makes contact with the contact 43 shorting out the resistor 44 and thereby providing energization of the relay coil 49. As the latter is energized the relay contacts 50 and 51 which are grounded as at 52 are opened and the full value of resistor 35 comes into effect in determining the bias on the grid 23a of the tube 21. When the bit or test piece 39 is removed the relay contacts close, the contact 50 thereby reducing the bias and the value of the resistor 35 on the tube 21. If oscillation should cease the closing of the momentary switch 38 by manual operation results in a substantial reduction in the cathode resistance of the oscillator tube 21 causing a surge of current which starts the oscillator.

In respect to the measuring of the output of the oscillator a suitable amplifier 53 has a suitable filter arrangement 54 of known type in its plate circuit and embodying a resistor 55 across which the voltage is measured by a suitable voltmeter 56. The anode 57 obtains operating voltage through the filter and resistor 55 by the line 58 connecting by suitable voltage dropping resistor 59 to the line 27. The voltage dropping resistor 60 extending from line 58 determines the screen voltages of the screen grids 61 and 62 of the tubes 21 and 53 respectively. The sensitivity of the instrument to fluctuations in line voltage may be reduced by providing the voltage regulator tube 63 and condenser 64 in parallel therewith from the scren grids to ground in the manner shown. A suppressor grid 65 of the amplifier 53 is connected directly to the cathode 66 thereof and the cathode is adjustable in its bias through the potentiometer 67 placed in a voltage divider circuit from the screen by being connected in series with the resistor 68 extending from the screen grid 62. A suitable condenser 69 for the desired by-pass is included.

The control grid 70 of the amplifier tube 53 is coupled to the high end 71 of coil 31 through the coupling condenser 72 and a pair of grid resistors 73 and 74 are connected in series to the ground point 75. However, when the bit is removed as previously discussed the signal reaching the grid will rise appreciably and in order to compensate for this condition and avoid damaging the meter the contact 51 is closed and the resistor 74 is shorted leaving only the resistor 73 to determine the voltage on the grid 70. It will be noted that not only do the resistors 44 and 45 serve as a voltage divider but also prevent the inductance of the relay coil 31 from building up a high potential across the pole pieces 40 and 41 whenever the relay circuit 42 is opened.

The adjustment of the resistor 34 in the cathode circuit of the oscillator tube 21 is all that is required to compensate for variations in line voltage, wear on the pole pieces, and to provide an appropriate setting for any particular size of bit. The potentiometer 67 controls the bias on the voltage amplifier tube 53 and thus may be employed to change the meter reading independently of the field as controlled by the variable resistor 34. The variable resistor 35 in the cathode circuit of the oscillator 21 is employed to adjust the field strength during the period when a test sample is not placed in contact with the pole pieces 40 and 41. This control is adjusted in the following manner.

The oscillator is started by shocking the circuit through the closure of the manual switch 38 and a bit sample is placed in contact with the pole pieces 40 and 41. The variable resistor 34 is adjusted until the meter 56 gives the desired reading for that bit.

The bit is then removed and in order to ensure that the oscillator will continue operating even though a defective contact is made the bit is again placed in contact with the pole pieces but through a sheet of paper or other suitable non-magnetic material of consistent thickness providing a predetermined gap between surfaces of the pole pieces and the test sample. The variable resistor 35 is then adjusted until the meter reads approximately zero. This method of adjustment will provide sufficient field to sustain the oscillator without damaging the meter and at the same time ensure that the test piece will give a defective reading if it is not making proper contact with the pole pieces 40 and 41.

For the sake of simplicity the meter may have provided thereon a red background area 76 and a green background area 77 wherein the green area will indicate an acceptable contact of the bit with the pole pieces 40 and 41. In general, however, it will be found that satisfactory bits having the desired hardness will read in the green area and the softer bits will read in the red area.

The device of this invention is of the "comparator" class and reference must always be made to standard samples with known characteristics. Operation depends upon magnetic properties and is, therefore, effected by mass, condition of contact, length of magnetic path involved and other factors.

The pole pieces 40 and 41 are of particular importance in respect to the contact surfaces thereof and it is necessary to provide substantially similar contact with samples of various dimensional variations. Preferably the pole pieces are made from cold rolled mild steel. The device described is particularly sensitive to the material of the sample immediately adjacent the points of contact with the pole pieces and it may be desirable to alter the position of the contacts for different tests having regard to dimensional variation of the samples. However, in regard to any one series of samples of the same dimensional characteristics spherical contact surfaces on the pole pieces have been found very desirable and these may be in the form of nodules or fingers with spherical tips lying into the recesses about the cutting edges of the bit.

Although the device herein disclosed is operable over a relatively high range of frequencies, the "skin effect" experienced in the test sample is a factor which must be taken into account and limits the best response to relatively low frequencies. Thus, in testing rock drilling bits for hardness, a frequency of about eighteen cycles per second has been found to give the best results.

It is intended that this disclosure should not be construed in any limiting sense aside from that indicated by the scope of the following claims.

What I claim as my invention is:

1. In a device for comparatively testing the hardness of magnetically permeable test samples of similar dimensional characteristics and employing an electronic circuit including an oscillator tube having at least a plate, a grid, and a cathode, and magnetic coupling means between the circuit of the plate and the circuit of the grid, the combination therewith of, a primary coil in the plate circuit and a secondary coil in the grid circuit including pole pieces associated with each of said coils and forming said magnetic coupling means, said pole pieces being shaped to contact surfaces of a test sample of magnetically permeable material, means associated with said primary coil providing a predetermined frequency of resonance of less than 60 cycles per second in the plate circuit, means for biasing said grid to provide oscillation in said oscillator when the test sample is in physical contact with said pole pieces, and a voltage measuring device including an amplifier tube coupled to the grid circuit of said oscillator tube, said voltage amplifier having an electronic tube including at least a grid, a plate, and a cathode, and adjustable grid biasing means for said amplifier grid whereby the current flowing through said amplifier tube may be adjusted to zero when a test sample is disposed outside the effective magnetic field of said pole pieces, and means for controlling the biasing of the grid of said oscillator tube when the test sample is so disposed to sustain oscillations in said oscillator whereby said voltage measuring device is responsive to the increase in voltage developed in the grid circuit of said oscillator when the test sample is placed in physical contact with said pole pieces to close the magnetic circuit of said coils.

2. In a device for comparatively testing the hardness of magnetically permeable test samples of similar dimensional characteristics and employing an electronic circuit including an oscillator tube having at least a plate, a grid, and a cathode, and magnetic coupling means between the circuit of the plate and the circuit of the grid, the combination therewith of: a primary coil in the plate circuit and a secondary coil in the grid circuit, pole pieces in each of said coils defining a magnetic core, an opening in said core adapted to be closed by a test sample of magnetically permeable material to physically close the magnetic circuit of said coils, means associated with said primary coil providing a predetermined frequency of resonance of a value less than 60 cycles per second in the plate circuit, means for biasing said grid to provide oscillation in said oscillator when the test sample is in physical contact with said pole pieces, and a voltage measuring device for measuring at least a part of the voltage between said grid and said cathode.

3. In a device for comparatively testing the hardness of magnetically permeable test samples of similar dimensional characteristics and employing an electronic circuit including an oscillator tube having at least a plate, a grid, and a cathode, and magnetic coupling means between the circuit of the plate and the circuit of the grid, the combination therewith of: a primary coil in the plate circuit and a secondary coil in the grid circuit, pole pieces in each of said coils defining a magnetic core, an opening in said core adapted to be closed by a test sample of magnetically permeable material to physically close the magnetic circuit of said coils, means associated with said primary coil providing a predetermined frequency of resonance of a value less than 60 cycles per second in the plate circuit, means for biasing said grid to provide oscillation in said oscillator when the test sample is in physical contact with said pole pieces, a voltage measuring device for measuring at least a part of the voltage between said grid and said cathode, the biasing means for said grid comprising a resistor in the cathode circuit of said tube electrically in series with the cathode and plate thereof across a source of supply voltage wherein positive voltage is supplied to the plate and the negative terminal of said source is connected to one end of said resistor, the other end being connected to said cathode, and means for reducing said resistance to a value to sustain oscillations in said oscillator when the test piece is removed from said pole pieces comprising a relay having a normally closed contact through which a point between the ends of said resistor may be connected to the negative terminal, a relay coil for actuating said contact and causing opening thereof, a separate source of energy for energizing said relay coil, a voltage divider across said source of energy, and means for connecting said coil to a small voltage portion of said voltage divider, and an electrical switch actuable when a test sample is in physical contact with said pole pieces and connected electrically across a large voltage portion of said voltage divider whereby said contact is open only when said relay is energized by engagement of a test sample with said pole pieces.

4. In a device for comparatively testing the hardness of magnetically permeable test samples of similar dimensional characteristics and employing an electronic circuit including an oscillator tube having at least a plate, a grid, and a cathode, and magnetic coupling means between the circuit of the plate and the circuit of the grid, the combination therewith of: a primary coil in the plate circuit and a secondary coil in the grid circuit, pole pieces in each of said coils defining a magnetic core, an opening in said core adapted to be closed by a test sample of magnetically permeable material to physically close the magnetic circuit of said coils, means associated with said primary coil providing a predetermined frequency of resonance of a value less than 60 cycles per second in the plate circuit, means for biasing said grid to provide oscillation in said oscillator when the test sample is in physical contact with said pole pieces, a voltage measuring device for measuring at least a part of the voltage between said grid and said cathode, the biasing means for said grid comprising a resistor in the cathode circuit of said tube electrically in series with the cathode and plate thereof across a source of supply voltage wherein positive voltage is supplied to the plate and the negative terminal of said source is connected to one end of said resistor, the other end being connected to said cathode, and means for reducing said resistance to a value to sustain oscillations in said oscillator when the test piece is removed from said pole pieces comprising a relay having a normally closed contact through which a point between the ends of said resistor may be connected to the negative terminal, a relay coil for actuating said contact and causing opening thereof, a separate source of energy for energizing said relay coil, a voltage divider across said source of energy, and means for connecting said coil to a small voltage portion of said voltage divider, and an electrical switch actuable when a test sample is in physical contact with said pole pieces and connected electrically across a large voltage portion of said voltage divider whereby said contact is open only when said relay is energized by engagement of a test sample with said pole pieces, said voltage measuring device comprising an electronic amplifier tube having at least a plate, a cathode, and a grid, means for biasing said amplifier grid including a variable resistor in the cathode circuit of said tube, means coupling the primary coil of said oscillator to the grid of said amplifier tube including a grid resistor of predetermined value extending between the grid and said negative terminal and a second normally closed contact openable by energization of said relay connected between the ends of said grid resistor and said negative terminal to reduce the voltage applied to the grid of said amplifier tube when the test sample is removed from engagement with said pole pieces.

5. In a device for comparatively testing the hardness of magnetically permeable test samples of similar dimensional characteristics and employing an electronic circuit including an oscillator tube having at least a plate, a grid, and a cathode, and magnetic coupling means between the circuit of the plate and the circuit of the grid, the combination therewith of: a primary coil in the plate circuit and a secondary coil in the grid circuit, pole pieces in each of said coils defining a magnetic core, an opening in said core adapted to be closed by a test sample of magnetically permeable material to physically close the magnetic circuit of said coils, means associated with said primary coil providing a predetermined frequency of resonance of a value less than 60 cycles per second in the plate circuit, means for biasing said grid to provide oscillation in said oscillator when the test sample is in physical contact with said pole pieces, a voltage measuring device for measuring at least a part of the voltage between said grid and said cathode, the biasing means for said grid comprising a resistor in the cathode circuit of said tube electrically in series with the cathode and plate thereof across a source of supply voltage wherein positive voltage is supplied to the plate and the negative terminal of said source is connected to one end of said resistor, the other end being connected to said cathode, and means for reducing said resistance to a value to sustain oscillations in said oscillator when the test piece is removed from said pole pieces comprising a relay having a normally closed contact through which a point between the ends of said resistor may be connected to the negative, a relay coil for actuating said contact and causing opening thereof, a separate source of energy for energizing said relay coil, a voltage divider across said source of energy, and means for connecting said coil to a small voltage portion of said voltage divider, and an electrical switch actuable when a test sample is in physical contact with said pole pieces and connected electrically across a large voltage portion of said voltage divider whereby said contact is open only when said relay is energized by engagement of a test sample with said pole pieces, and a manually actuable switch in series with a resistance of relatively low value disposed in parallel with said cathode resistance whereby the biasing on said grid may be suddenly and manually changed to initiate oscillations in said oscillator.

ROBERT SIDNEY SEGSWORTH.

References Cited in the file of this patent

UNITED STATES PATENTS

| Number | Name | Date |
|---|---|---|
| 1,943,619 | Mudge et al. | Jan. 16, 1934 |
| 1,996,906 | DeLanty | Apr. 9, 1935 |
| 2,048,591 | Berry | July 21, 1936 |
| 2,267,884 | Zuschlag | Dec. 30, 1941 |
| 2,292,798 | Roberts | Aug. 11, 1942 |
| 2,326,344 | Elmendorf et al. | Aug. 10, 1943 |
| 2,337,231 | Cloud | Dec. 21, 1943 |
| 2,441,380 | Zuschlag | May 11, 1948 |
| 2,595,380 | Hudson | May 6, 1952 |